April 18, 1950     A. BOSCHI     2,504,634
SOUND AND VIBRATION PROOF JOINT FOR METAL TUBING
Filed Feb. 19, 1948
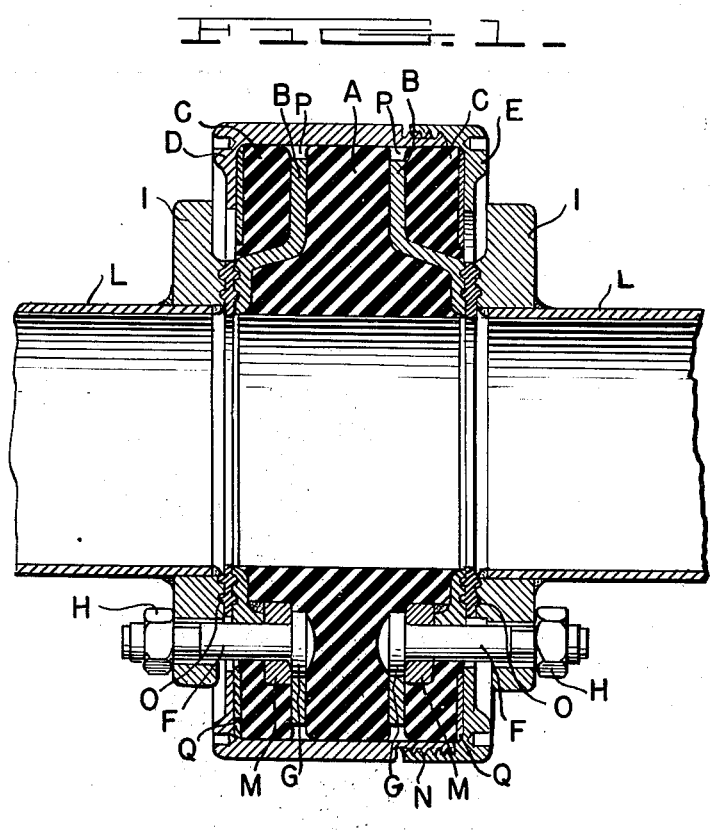
Inventor.
Antonio Boschi.
By Stone, Boyden & Mash
Attorneys.

UNITED STATES PATENT OFFICE 2,504,634

SOUND AND VIBRATIONPROOF JOINT FOR METAL TUBING

Antonio Boschi, Milano, Italy, assignor to Pirelli Societa per Azioni, Milano, Italy, a corporation of Italy Application February 19, 1948, Serial No. 9,603
In Italy November 17, 1941

4 Claims. (Cl. 285—90)

Section 1, Public Law 690, August 8, 1946
Patent expires November 17, 1961

This invention pertains to elastic joints for hollow metal conduits and more particularly has reference to joints for insulating adjoining lengths of metal tubing from transmitting sound and vibration to which they are subject and is especially applicable to metal tubing for ships and submarines.

It is well known that when metal tubing, which consists of a series of tubing lengths joined end to end, is subjected in any of its lengths to noise and vibration, such lengths set up periodic vibrations which are transmitted from one length to another, and this adversely affects the use of such tubing for many purposes.

An object of this invention is to provide a joint between lengths of metal tubing which will prevent the transmission of sound and vibration from one length to another by interrupting vibrations of given periodicity.

Another object of this invention is to provide a joint between lengths of metal tubing which will insulate such lengths of metal tubing from transmitting sound and vibration by means of a vibration absorbing elastic medium.

Still another object is to provide an elastic joint between lengths of metal conduit which is adjustable to resist internal pressures of various magnitudes.

With these and other objects in view which may be incident to my improvements, my invention consists of the combination and arrangement of elements hereinafter described and illustrated in the accompanying drawing which shows a longitudinal, diametral section of my novel joint, as applied to adjoining lengths of metal tubing.

In the drawing, the reference character A denotes a central, annular, rubber sleeve of generally trapezoidal cross-section, which is bonded on each of its lateral faces to a curved, annular metal disc B having a series of circumferentially spaced seats M for the reception of heads G of bolts F. To the outer side face of each disc B is bonded a rubber ring C whose section fills the space outside the curved portion of each disc B, so that sleeve A, discs B and rings C form a composite annulus of substantially rectangular cross-section, as clearly shown in the drawing.

Embracing the outer side faces of rings C are metal collars D and E which are adjustably connected together by screw threads N. To facilitate the rotation of either or both collars D and E, a metal washer Q may be inserted between the outer side faces of rings C and collars D and E, and either bonded to said rings or not, as desired. By screwing collars D and E together, rings C and sleeve A may be adjustably compressed to the proper degree to resist any inner radial pressure on the composite annulus and to interrupt the periodicity of vibrations in tubing lengths L to which said annulus is connected by bolts F passing through a metal flange I welded to each tube length L, and nuts H threaded on said bolts. A suitable non-metallic gasket O is inserted between each collar I and adjacent disc B to seal the joints therebetween.

The construction of my novel joint, and especially the curvature of disc B, causes the internal pressure in tubing lengths L to compress sleeve A and rings C against discs B to reinforce the bonds between these elements. Air spaces P surrounding the outer edges of discs B permit the expansion of sleeve A and rings B when these elements are compressed by the tightening of collars D and E and by any internal pressure acting on the inside surface of said sleeve.

While I have shown and described the preferred embodiment of my invention, it is to be understood that I do not limit myself to the precise details disclosed by way of illustration, as these may be changed and modified by those skilled in the art without departing from the spirit of my invention or exceeding the scope of the appended claims.

I claim:

1. A sound and vibration proof joint for connecting two lengths of metal tubing, comprising: a central rubber sleeve, enclosed between a pair of curved metal discs, which are in turn enclosed between a pair of rubber rings, each ring being seated on the outer curved portion of each of said discs; said sleeve, discs and rings being bonded together by vulcanization and forming a composite annulus of substantially rectangular cross-section; said annulus being enclosed between a pair of metal collars which are adjustably connected by screw threads; and means for connecting said annulus to the adjoining ends of said lengths of metal tubing.

2. A joint according to claim 1, including a pair of non-metallic gaskets, each inserted between one of said discs and an adjacent flange on one of said lengths of tubing; all of the elements of said joint being so arranged and adapted to prevent any metal-to-metal contact between said lengths of tubing.

3. A joint according to claim 1, wherein said rubber elements are adapted to insulate each connected length of tubing so that no vibrations can be transmitted from one length of tubing to the other.

4. A joint according to claim 1, wherein said collars are adapted to adjustably compress said sleeve and rings so that they effectively resist an internal pressure in said tubing and interrupt and absorb periodic vibrations in the connected lengths of tubing.

ANTONIO BOSCHI.

REFERENCES CITED

The following references are of record in the file of this patent:

UNITED STATES PATENTS

| Number | Name | Date |
|---|---|---|
| 2,047,904 | Hollatz | July 14, 1936 |
| 2,267,085 | Dezendorf | Dec. 23, 1941 |

FOREIGN PATENTS

| Number | Country | Date |
|---|---|---|
| 394,527 | Italy | Apr. 30, 1942 |